April 20, 1943. W. C. BARON 2,316,833
TACKLE BOX
Filed July 13, 1942
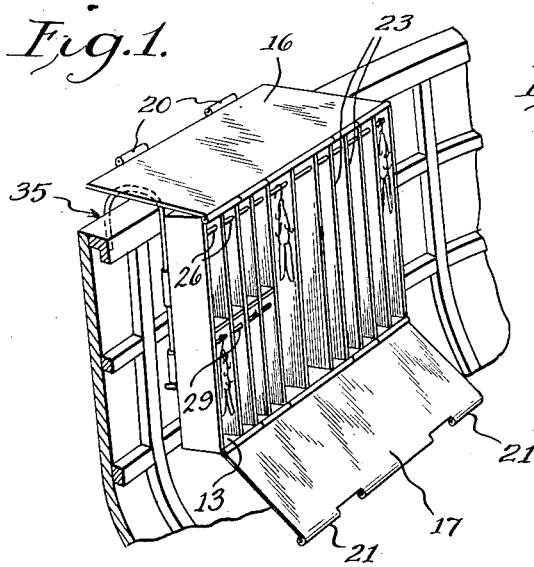
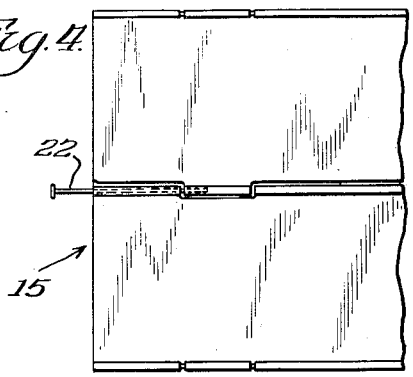
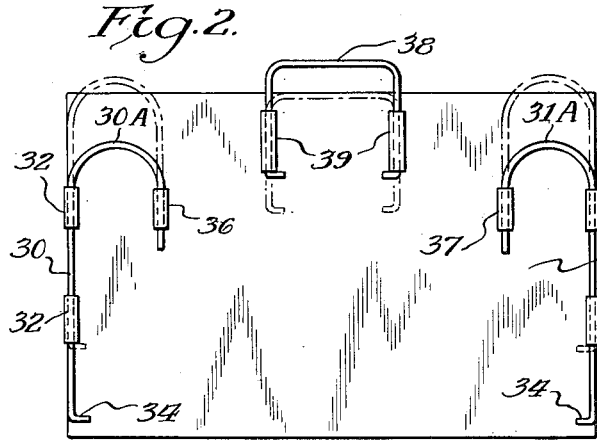
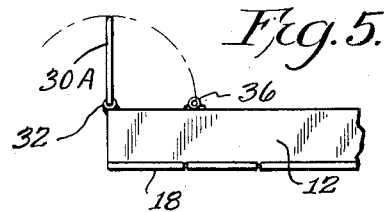
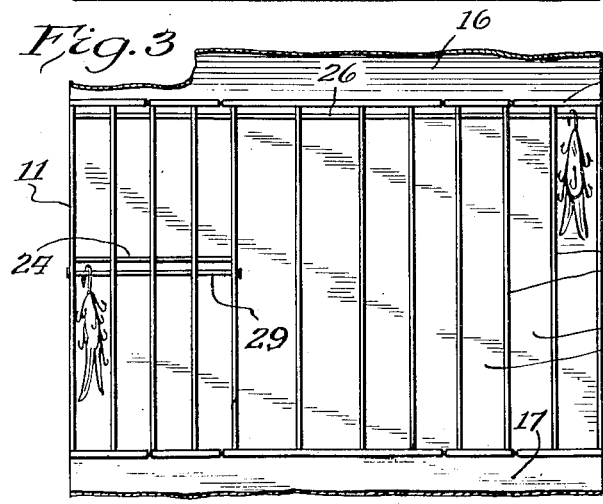
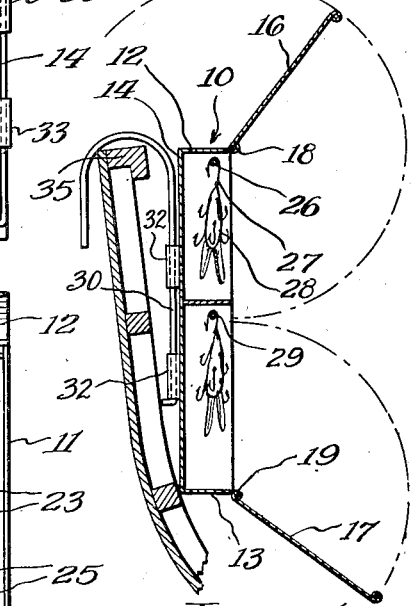
Inventor
Walter C. Baron
By
Max Richard Kraus
Atty.

Patented Apr. 20, 1943

2,316,833

UNITED STATES PATENT OFFICE 2,316,833

TACKLE BOX

Walter C. Baron, Chicago, Ill.

Application July 13, 1942, Serial No. 450,679

3 Claims. (Cl. 43—32)

This invention relates to tackle boxes in which casting lures and other fishing equipment is held.

One of the objects of this invention is to provide a container in which the casting lures are maintained in a suspended position in the container, are readily accessible for use and can be instantly removed.

Another object is to provide a tackle box which is portable and which can be easily and instantly secured to the side of a boat so that the equipment within the box is readily accessible for use.

Another object is to provide a box which is very economical to manufacture. Other objects will become apparent as the description progresses.

In the drawing, Figure 1 is a perspective view of my tackle box showing same supported in the boat.

Figure 2 is a rear view of said box with the hooking members in out of use position.

Figure 3 is a front elevational view of said box.

Figure 4 is a front elevational view showing the covers of the box in closed position.

Figure 5 is a top plan view of a portion of the box, showing the position to which the hooking member is swung when in hooking position, and, Figure 6 is a cross-sectional view showing the box secured to the boat, the box being in open position.

The box comprises a casing generally indicated at 10, formed of end walls 11, a top 12, a bottom 13, a rear wall 14 and a front closure generally indicated at 15. The closure is formed of a pair of cover members 16 and 17 hinged at 18 and 19 respectively. For locking the cover members together, I provide curled ears 20 and 21 spaced on each of the cover members, which ears are engaged by a sliding rod 22.

The interior of the casing or container has a plurality of partitions 23 and a transverse partition 24 which divides the container into compartments 25, and the compartments are adapted to hold the casting lures and other fishing equipment.

I have found that casting lures when kept in a tackle box have a tendency to become hooked to each other and to the other equipment in the box thus resulting in a loss of time in separating same and also sometimes in injury to the fisherman during the process of thus separating them. To obviate this, I have provided means for holding each casting lure in a suspended position, separated from the others and wherein it is readily accessible for use. A longitudinal rod 26 is provided, same passing through each of the partitions and being securely fastened in the end walls 11. The rod 26 is spaced proximate to the top 12 of the casing so that the prime hook 27 of the casting lure 28 can be readily inserted thereon and removed therefrom in a minimum of time. However, it will be observed that the spacing of the rod 26 with respect to the top wall 12 will not permit the casting lure to become dislodged from the rod unless manually removed therefrom. A similar though shortened rod 29 is provided adjacent the transverse partition 24.

On the rear wall 14 of the casing, I provide a pair of hanging members 30 and 31 which are slidably mounted in sleeves 32 and 33 secured to the rear wall 14. One end of each of the hanging members is bent as at 34 to provide a stop to limit the upward movement of the hanging member. The upper end of each of the hanging members is curved to form a hook 30A and 31A which hooks over the side of the boat 35 as shown in Figures 1 and 6 to hold the box in place in upright position in the boat. To maintain the hooking members in non-hooking position as when the box is being transported, I provide a pair of locking sleeves 36 and 37 on the rear wall into which the outer portions of the hook ends slide and maintain the hook ends of the hanging members adjacent the rear wall and out of interference. To use the hanging members, they are raised as shown in dotted lines in Figure 2 and swung 90° from the rear wall to the position shown in Figure 5, whence they are ready for attachment to the side of the boat. For transporting the box I provide a slidable handle 38 held in place by a pair of sleeves 39.

With my invention I have provided a tackle box which will support casting lures and other fishing equipment in an orderly manner and which can be easily secured to a boat to maintain the equipment in a position readily accessible for use by the fisherman inside the boat.

It will be understood that various changes and modifications can be made without departing from the spirit and scope of my invention. What I desire to secure by Letters Patent is:

1. In a structure of the class described, a container divided into a plurality of compartments, means in said compartments for maintaining casting lures in a supported and suspended position, hooking members on said container securable on the side of a boat for supporting said container inside said boat, said hooking members being movable into hooking and non-hooking positions.

2. In a structure of the class described, a container divided into a plurality of compartments, a rod extending through said compartments to which casting lures are secured for supporting same in a suspended position, hooking members on said container securable on the side of a boat for supporting said container inside said boat, said hooking members being movable into hooking and non-hooking positions and means for locking same in non-hooking position.

3. In a structure of the class described, a container divided into a plurality of compartments, a rod extending through said compartments to which casting lures are secured for supporting same in a suspended position, hooking members on the rear wall of said container securable on the side of a boat for supporting said container inside said boat, said hooking members being swingable into hooking and non-hooking positions, same being held in position adjacent the rear wall of the container when in non-hooking position.

WALTER C. BARON.